July 4, 1944.  C. R. HINDS  2,352,788
MUD HOOK
Filed April 10, 1942
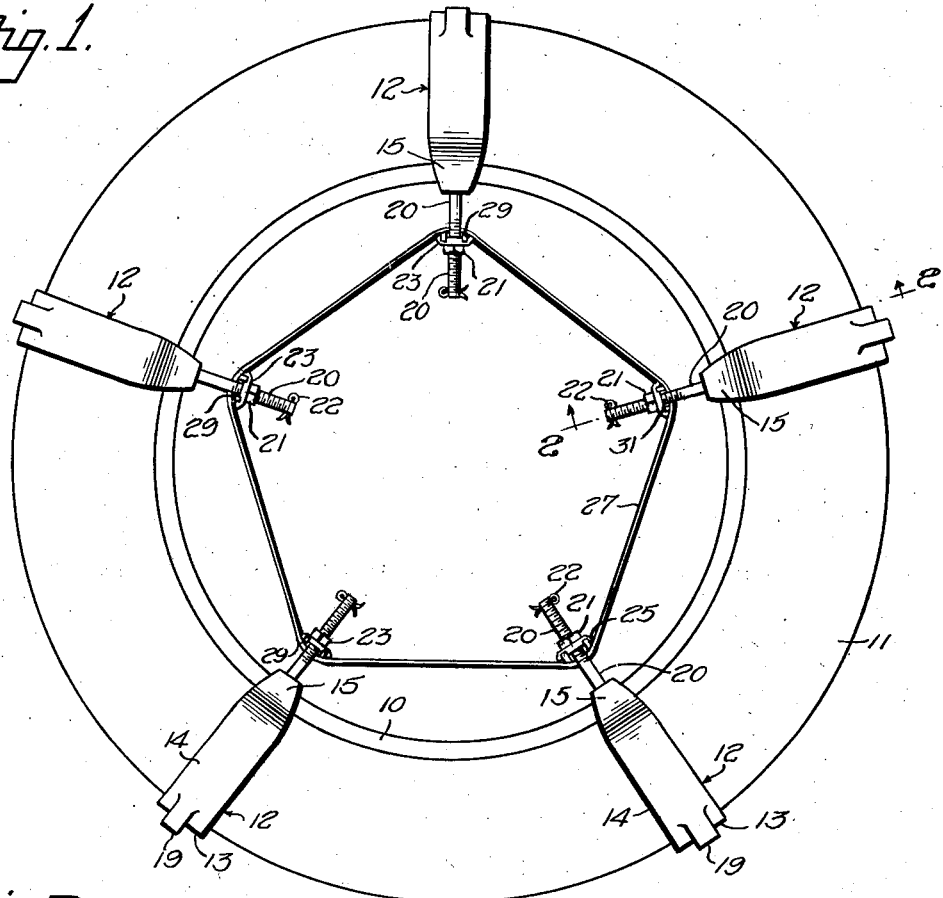
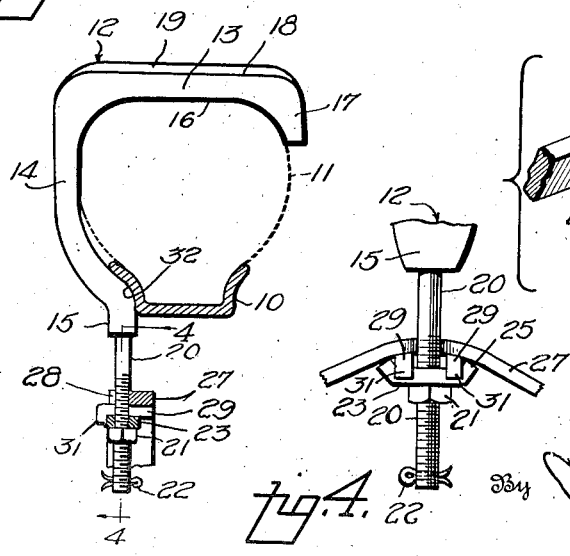
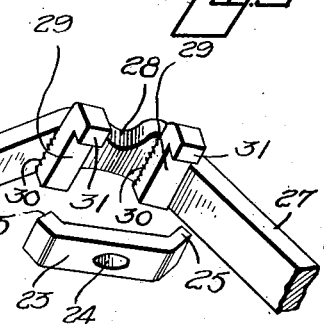
Inventor
CARL R. HINDS Patented July 4, 1944

2,352,788

UNITED STATES PATENT OFFICE 2,352,788

MUD HOOK

Carl R. Hinds, Sioux City, Iowa

Application April 10, 1942, Serial No. 438,471

2 Claims. (Cl. 152—226)

This invention relates to mud hooks for motor vehicles.

An important object of the invention is to provide a novel mud hook construction whereby each of a plurality of such hooks may be readily placed in position on a motor vehicle tire from the outside thereof, thus greatly simplifying the attachment of the device.

A further object is to provide novel means for connecting a plurality of the mud hooks with respect to each other about a tire, the connecting means being of such nature as to very effectively hold the mud hooks in position while at the same time permitting them to be easily attached in a short period of time.

A further object is to provide a novel arrangement of the mud hook, wheel rim and connecting means with respect to each other so as to establish cooperative relationship whereby the individual mud hooks are more effectively retained in position.

Other objects and advantages of the invention will become apparent during the course of the following description.

In the drawing I have shown one embodiment of the invention. In this showing:

Figure 1 is a side elevation of a motor vehicle tire showing the invention applied, Figure 2 is a section taken on line 2—2 of Figure 1, parts being shown in elevation, and the vehicle tire tire being shown in dotted lines, Figure 3 is an enlarged fragmentary perspective view of a portion of the tie band and one of the connecting clips, and, Figure 4 is an enlarged fragmentary side elevation showing the means for connecting the tie band to one of the mud hooks.

Referring to Figure 1, the numeral 10 designates the rim of a motor vehicle wheel on which is mounted the usual tire 11. The present invention comprises a plurality of mud hooks adapted to be mounted on the tire 11, together with connecting means for the mud hooks. Each mud hook is indicated as a whole by the numeral 12 and comprises a transverse portion 13 and a side arm 14 terminating in an inwardly radially extending portion 15 for a purpose to be described. The inner surface 16 of the transverse portion 13 is shaped to conform to the transverse shape of the tread surface of the tire, the surface 16 extending around a portion of the side arm 14 and around a portion of the inside of the tire to form the inner surface of an inwardly extending hook portion 17.

The outer surface 18 of the transverse portion 13 may be flat as shown in Figure 2. The portion 13 of each mud hook comprises, in itself, a traction element, but each such portion of the mud hook is preferably provided with a rib 19 to afford additional traction.

Each mud hook is provided with a threaded shank 20 connected to the extended portion 15, the shank 20 lying radially with respect to the tire when the device is installed as will be apparent from Figure 1. The threaded portion of each shank 20 carries a nut 21 threaded thereon and the radially inner end of each shank is preferably provided with a cotter pin 22 to prevent any possible loss of the nut 21. A clip 23 is provided therethrough with an opening 24 slidably receiving the shank 20 between the extension 15 and nut 21. The clip 23 is provided with radially outwardly turned ends 25. A steel or similar tie band 27 is employed for securing the mud lugs in position. This tie band is provided with notches 28 (Figure 3) at equidistantly spaced points corresponding to the locations of the respective shanks 20. Each of these shanks extends through one of the notches 28, as will be apparent. At each side of each notch 28, the band 27 is provided with lugs 29 each welded as at 30 to the band 27, or otherwise secured thereto. The lugs 29 project from one edge of the band 27 in a direction away from the vehicle wheel and terminate in radially inwardly turned ends 31 as clearly shown in Figures 2, 3 and 4.

When the parts are assembled as shown in Figure 2, it will be apparent that the shanks 20 are offset from the center of the tire whereby the transmission of a radially inward force to each shank 20 would tend to swing the associated mud lug. It will be noted, however, that the body of each mud lug has a curved shoulder 32 which engages against the transversely curved adjacent side surface of the rim 10 and this engagement assists in anchoring each mud lug in proper position, as will become apparent.

The operation of the device is as follows:

Each mud hook is placed in position by tilting it relative to the position shown in Figure 2 so that the shank 20 extends away from the tire and radially inwardly at such angle as to permit the hook portion 17 to be engaged over the inner portion of the tire. The device will fit relatively tightly over the tire, but with the device in the position referred to the operator may press inwardly and downwardly against the shank 20 to force the mud hook to the position shown in Figure 2. Each mud hook is relatively wide and has its inner surface curved to conform to the transverse curvature of the tire. Therefore, none of the mud hooks will cause any injury to the tire in operation.

The inward forcing of the shank 20 toward the tire will take place with the tie band 27 held in position with one of the notches 28 arranged to receive therein the shank 20 of the mud hook. With the shank 20 in such position, the operator will slide the clip 23 radially outwardly to engage it against the radially inner surfaces of the lugs 29 against thhe ends 31 thereof as shown in Figures 2 and 4.

The operator will then rotate the associated nut 21 to bring it into contact with the clip 23. Each successive mud hook will be placed in position in the same manner, whereupon the nuts 21 may be equally tightened to tension the tie band 27 and tightly hold the transverse portions 13 of the mud hooks in firm engagement with the tread of the tire. The tensioning of the tie band exerts a radially inward force upon each mud hook and this force will be transmitted through the shanks 20 which are somewhat offset from the center of the tire as shown in Figure 2. This force would tend to swing the mud hooks to rock them around the tire. Such displacement of the mud hooks is prevented however, by the seating of the shoulder 32 against the rim 10 to prevent the swinging of the mud hooks. It will be apparent that upon radially inward movement of the mud hooks as they contact with the road, the corresponding shoulders 32 may move radially inwardly over the side surface of the rim without permitting appreciable swinging of the mud hooks. Thus these elements will be effectively and tightly retained in their proper positions to perform their intended function.

It will be obvious that the mud hooks readily may be placed in position from the outside of the tire, while the latter remains on the ground, even if it is relatively deeply embedded in mud. It is unnecessary for the operator to jack the wheel from the ground, and it is wholly unnecessary to crawl under the vehicle to fasten or place in position any elements inside the wheel. The only elements which lie inwardly of the tire toward the body of the vehicle are the hooks 17 of the mud lugs which are placed in position from the outside of the tire in the manner previously described.

It will be noted that five of the mud lugs preferably are provided. This is an advantageous number of mud hooks for several reasons. In the first place a smaller number of hooks will result in too large a gap between any adjacent pair of hooks, thus causing the wheel to lose traction when in relatively shallow mud. Moreover, a number of mud hooks greater than five would involve a useless expense since five of the units has been found sufficient under all conditions. Additionally, it has been found that even with a wheel relatively deeply mired, four of the mud hooks readily may be placed in position and the wheel rotated a sufficient distance to permit the attachment of the remaining mud hook. An additional advantage of the use of an odd number of mud hooks, and preferably five, lies in the fact that no mud hook is diametrically opposite any other one. Therefore no radially inward force against one mud hook will be directly transmitted to an opposite hook to tend to loosen it. Such force in the present device will be in line with the space between two hooks at the opposite side of the tire and the force will be divided between such two hooks and will be at on angle thereto. The two hooks referred to therefore will not be appreciably moved. In this connection it will be noted that for maximum strength the tie band is relatively rigid and therefore is capable of transmitting radial forces.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A mud lug assembly for a vehicle tire comprising a plurality of bodies each of which comprises a traction portion adapted to extend transversely of the tire over the tread portion thereof, an arm formed with one end of the traction portion and extending radially inwardly, and a radially inwardly projecting shank carried by the radially inner extremity of the arm of each body, a tie band, a plurality of lugs carried by said band and arranged in pairs corresponding in position to said shanks to receive the latter therebetween, a clip engageable against said lugs radially inwardly thereof and having an opening to slidably receive the adjacent shank, and a nut threaded on each shank and engageable against the radially inner face of the associated lug.

2. A mud lug assembly for a vehicle tire comprising a plurality of bodies each of which comprises a traction portion adapted to extend transversely of the tire over the tread portion thereof, an arm formed integral with one end of the traction portion and extending radially inwardly, and a radially inwardly projecting shank carried by the radially inner extremity of the arm of each body, a tie band, a plurality of lugs carried by said band and arranged in pairs corresponding in position to said shanks to receive the latter therebetween, each lug extending from the body of the tie band in a direction away from the vehicle wheel and having its end turned radially inwardly, a clip arranged against the radially inner faces of each pair of lugs between the tie band and the turned ends of the lugs, each clip having its ends extending beyond the remote edges of the associated pair of lugs and turned radially outwardly along such edges, and a nut threaded on each shank and engageable against the radially inner face of the associated clip.

CARL R. HINDS.